(12) United States Patent
Okamoto

(10) Patent No.: US 9,019,558 B2
(45) Date of Patent: Apr. 28, 2015

(54) IMAGE PROCESSING SYSTEM, IMAGE RECOMMENDATION METHOD, INFORMATION PROCESSING APPARATUS, AND STORAGE MEDIUM

(71) Applicant: Canon Kabushiki Kaisha, Tokyo (JP)

(72) Inventor: Yuta Okamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 13/648,107

(22) Filed: Oct. 9, 2012

(65) Prior Publication Data

US 2013/0094038 A1 Apr. 18, 2013

(30) Foreign Application Priority Data

Oct. 12, 2011 (JP) .................................. 2011-225103

(51) Int. Cl.
*G06K 15/02* (2006.01)
*H04N 1/00* (2006.01)

(52) U.S. Cl.
CPC .... *H04N 1/00307* (2013.01); *H04N 2201/3207* (2013.01); *H04N 2201/3253* (2013.01); *H04N 2201/3205* (2013.01); *H04N 2201/3209* (2013.01)

(58) Field of Classification Search
None
See application file for complete search history.

(56) References Cited

U.S. PATENT DOCUMENTS

| 7,298,931 | B2* | 11/2007 | Kim et al. ...................... 382/305 |
| 7,343,365 | B2* | 3/2008 | Farnham et al. .............. 715/853 |
| 7,716,157 | B1* | 5/2010 | Bourdev et al. ............... 382/118 |
| 7,916,976 | B1* | 3/2011 | Kedikian ...................... 382/305 |
| 8,136,167 | B1* | 3/2012 | Gossweiler et al. ............ 726/27 |
| 2005/0197846 | A1* | 9/2005 | Pezaris et al. ...................... 705/1 |
| 2011/0016408 | A1* | 1/2011 | Grosz et al. ................... 715/745 |
| 2013/0055101 | A1* | 2/2013 | Sabur ............................ 715/739 |
| 2013/0332857 | A1* | 12/2013 | Kim et al. ..................... 715/753 |
| 2014/0093184 | A1* | 4/2014 | Wang ............................ 382/254 |
| 2014/0099026 | A1* | 4/2014 | Krishnaswamy et al. .... 382/167 |
| 2014/0133764 | A1* | 5/2014 | Hong et al. ................... 382/224 |
| 2014/0195371 | A1* | 7/2014 | Kageyama et al. .......... 705/26.7 |

FOREIGN PATENT DOCUMENTS

| JP | 2004-54751 A | 2/2004 |
| JP | 2006-323580 A | 11/2006 |
| JP | 2009-169620 A | 7/2009 |

* cited by examiner

*Primary Examiner* — Kimberly A Williams
(74) *Attorney, Agent, or Firm* — Canon USA Inc. IP Division

(57) ABSTRACT

An image processing system includes a first determination unit configured to determine a relationship between a user and another person established through utilization of a predetermined service, a second determination unit configured to determine a relationship between a first image, which is of the user and has been subjected to image correction processing, and a second image, which is of the another person, and a recommendation unit configured to, based on a determination result of the first determination unit and a determination result of the second determination unit, recommend image correction processing performed on the second image to the user.

15 Claims, 11 Drawing Sheets

FIG.5

TABLE a

| IDENTIFIER | TYPE | WEIGHTING |
|---|---|---|
| 1 | USER | 0.4 |
| 2 | USER | 0.2 |
| 3 | USER | 0.3 |
| 4 | USER | 0.2 |

TABLE b

| IDENTIFIER | ADJACENT POINT | WEIGHTING |
|---|---|---|
| 1 | 3 | 0.3 |
| 1 | 4 | 0.1 |
| 2 | 1 | 0.2 |
| 3 | 2 | 0.2 |
| 3 | 3 | 0.1 |
| 4 | 1 | 0.2 |

FIG.7

ARCHIVE 2b

```
<CORRECTION PROCEDURE IDENTIFIER = "1">
  <SPACE FILTER RADIUS = "0.75"/>
  <RED-EYE PROCESSING LATERAL = "50" VERTICAL = "75"
   WIDTH = "100" HEIGHT = "25"/>
  <γ CURVE CORRECTION γ CURVE = "2.2"/>
  <SKIN COLOR EMPHASIS EMPHASIS AMOUNT = "4"/>
</CORRECTION PROCEDURE>
```

TABLE 2a

| HISTORY NUMBER | CORRECTION PROCEDURE IDENTIFIER | IMAGE FEATURE IDENTIFIER | USER IDENTIFIER |
|---|---|---|---|
| 1 | 1 | 1 | 1 |
| 2 | 2 | 2 | 2 |
| 3 | 3 | 2 | 2 |
| 4 | 4 | 3 | 3 |

TABLE 2c

| IMAGE FEATURE IDENTIFIER | HISTOGRAM | EDGE AMOUNT | FACE REGION | SHOOTING LATITUDE | SHOOTING LONGITUDE | SHOOTING DATE/TIME |
|---|---|---|---|---|---|---|
| 1 | 10, 20, 30, 50, 20 | 2 | 1 | 35.57 | 139.68 | 2010/01/01 |
| 2 | 20, 20, 40, 20, 20 | 2 | — | 35.66 | 139.75 | 2010/02/01 |
| 3 | 0, 30, 20, 50, 10 | 3 | 2 | 35.66 | 139.75 | 2010/03/01 |

TABLE 2d

| IMAGE FEATURE IDENTIFIER | LATERAL | VERTICAL | WIDTH | HEIGHT | RED-EYE | NAME |
|---|---|---|---|---|---|---|
| 1 | 100 | 200 | 150 | 300 | YES | A |
| 3 | 150 | 250 | 100 | 200 | NO | B |
| 3 | 300 | 450 | 100 | 200 | YES | C |
| 4 | 200 | 100 | 100 | 200 | YES | D |

IMAGE PROCESSING SYSTEM, IMAGE RECOMMENDATION METHOD, INFORMATION PROCESSING APPARATUS, AND STORAGE MEDIUM

BACKGROUND

1. Field of the Invention

The present disclosure relates to an image processing system, an image recommendation method, an information processing apparatus, and a storage medium.

2. Description of the Related Art

When image data is displayed on a screen, or printout is performed, processing for performing various correction processing on the image data, for the purpose of improving visual quality or the like, is generally performed. When such an image correction is performed, a user instructs a procedure of correction processing (hereinafter, referred to as "correction procedure"), using an image processing software or online service, and thereby conversion into an image which is consistent with the user's preference is generally performed.

In order to correct the image data and to convert it into an image which is consistent with the user's preference, it is necessary to appropriately configure the correction procedure. However, the configuration of the correction procedure is a work which requires a high proficiency level and a large effort, and there is an issue that each parameter setting necessary for carrying out the intended image correction is cumbersome for a user who is not skilled in the configuration of the correction procedure.

As conventional techniques for solving the issue, a technique for applying again the correction procedure which was performed in the past on an image having a feature similar to a correction target image (hereinafter, referred to as "similar image"), to the correction target image is well-known.

For example, Japanese Patent Application Laid-Open NO. 2006-323580 discusses a technique, by storing features of image data in association with correction procedures which were performed on the image data, for subjecting the correction target image data to the correction processing which was applied to an image similar to the correction target image data.

Further, Japanese Patent Application Laid-Open No. 2004-54751 discusses a technique, by accumulating optimal correction procedures for each sample image in advance, for selecting a correction procedure which is associated with the sample image that is most similar to the processing target image, and subjecting the processing target image to correction in accordance with the selected correction procedure.

Further, Japanese Patent Application Laid-Open No. 2009-169620 discusses a technique in which another user divided into the same category according to user information such as genders, or ages, when a certain user performs correction on the correction target image, performs correction on the correction target image based on the correction procedure performed on an image similar to the processing target image.

On the other hand, when a user searches information accumulated on the network, use of a social graph, which is information in which relationships among users are expressed as a graph structure, for the purpose of sorting the information which the user seeks from enormous information, is generally performed. More specifically, by finding users who have preference close to each other with use of the social graph, and by using evaluations which the users close to the preference gave to the information, discovery of the information which is consistent with the preference of the user herself/himself is facilitated.

SUMMARY

According to an aspect of the present invention, an image processing system includes a first determination unit configured to determine a relationship between a user and another person established through utilization of a predetermined service, a second determination unit configured to determine a relationship between a first image, which is of the user and has been subjected to image correction processing, and a second image, which is of the another person, and a recommendation unit configured to recommend, based on a determination result of the first determination unit and a determination result of the second determination unit, image correction processing performed on the second image to the user.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating an example of a social graph recording unit.

FIG. 7 is a diagram illustrating an example of a correction history recording unit.

DESCRIPTION OF THE EMBODIMENTS

Figure 1:
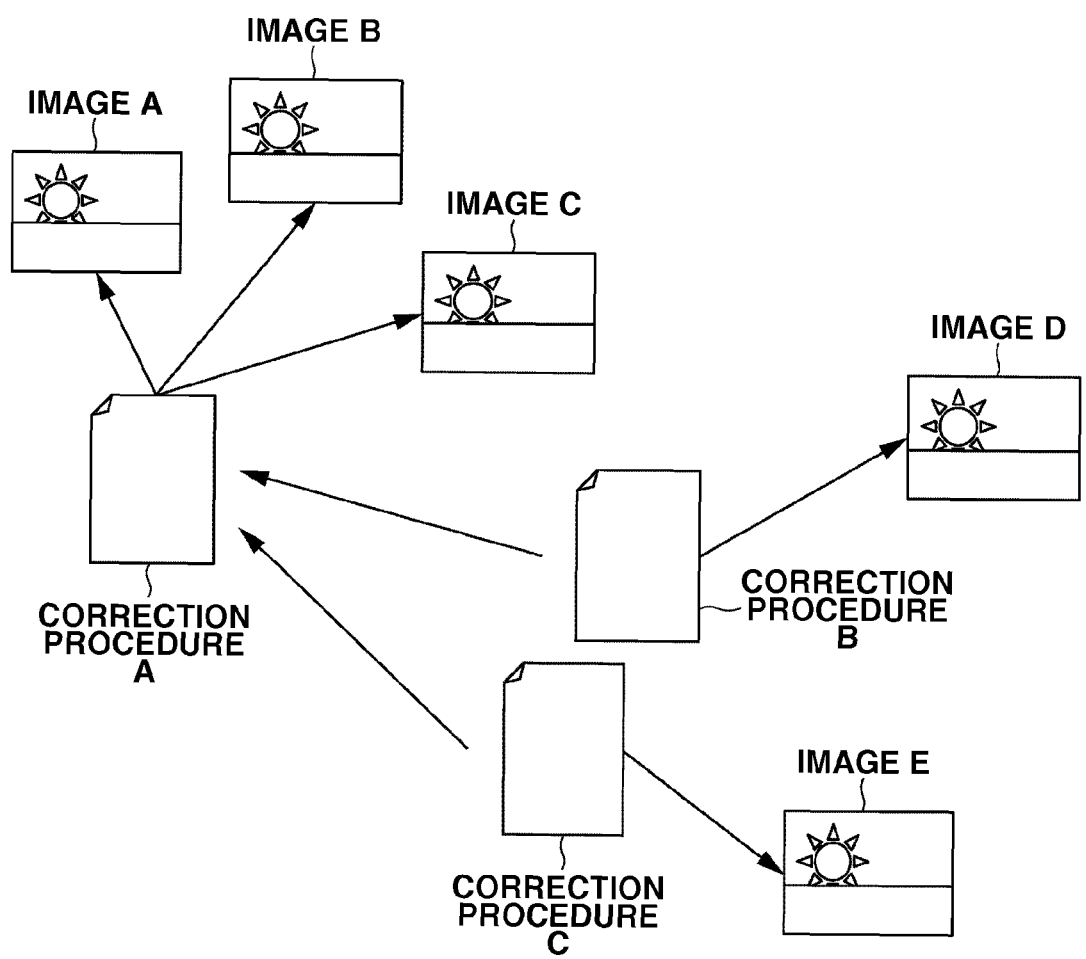
FIG. 1 is a diagram illustrating an example of applying a correction procedure configured when performed on a certain image data, to other images again, or newly configuring a derived correction procedure based on the correction procedure.

Various exemplary embodiments, features, and aspects of the invention will be described in detail below with reference to the drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Each user has preference different from each other for finish of an image. However, in the above-described conventional techniques, a correction procedure which enables an image to be converted into an image which is consistent with each user's preference cannot be always presented.

For example, in a technique discussed in Japanese Patent Application Laid-Open No. 2006-323580, the procedure for correction processing to be stored in an image processing system needs to be created in advance by a user herself/himself. Therefore, if the correction procedure of a similar image has not been configured previously, it is difficult to convert it into an image which is consistent with preference of the user herself/himself.

Further, in the technique discussed in Japanese Patent Application Laid-Open No. 2004-54751, image processing is performed by selecting a correction procedure which corresponds to a sample image most similar to the processing target image, from among correction procedures accumulated in advance. Consequently, in a case where a plurality of users with different preferences for finishes of images accumulates correction procedures, there arises inconvenience that a correction procedure which is consistent with each user's preference cannot be always selected.

Further, in the technique discussed in Japanese Patent Application Laid-Open No. 2009-169620, for users who utilize the image processing system, the users having similar characteristics in terms of gender or ages, perform image processing by using the correction procedure performed on an image having a feature similar to the processing target image. However, in a case where preference of other users having the same characteristic does not match the preference of the user herself/himself, there is a problem that good results cannot be obtained.

The present technique has been devised to facilitate application of the correction procedure which other user having a similar hobby or a taste has configured, to the image data of the user.

Figure 2:
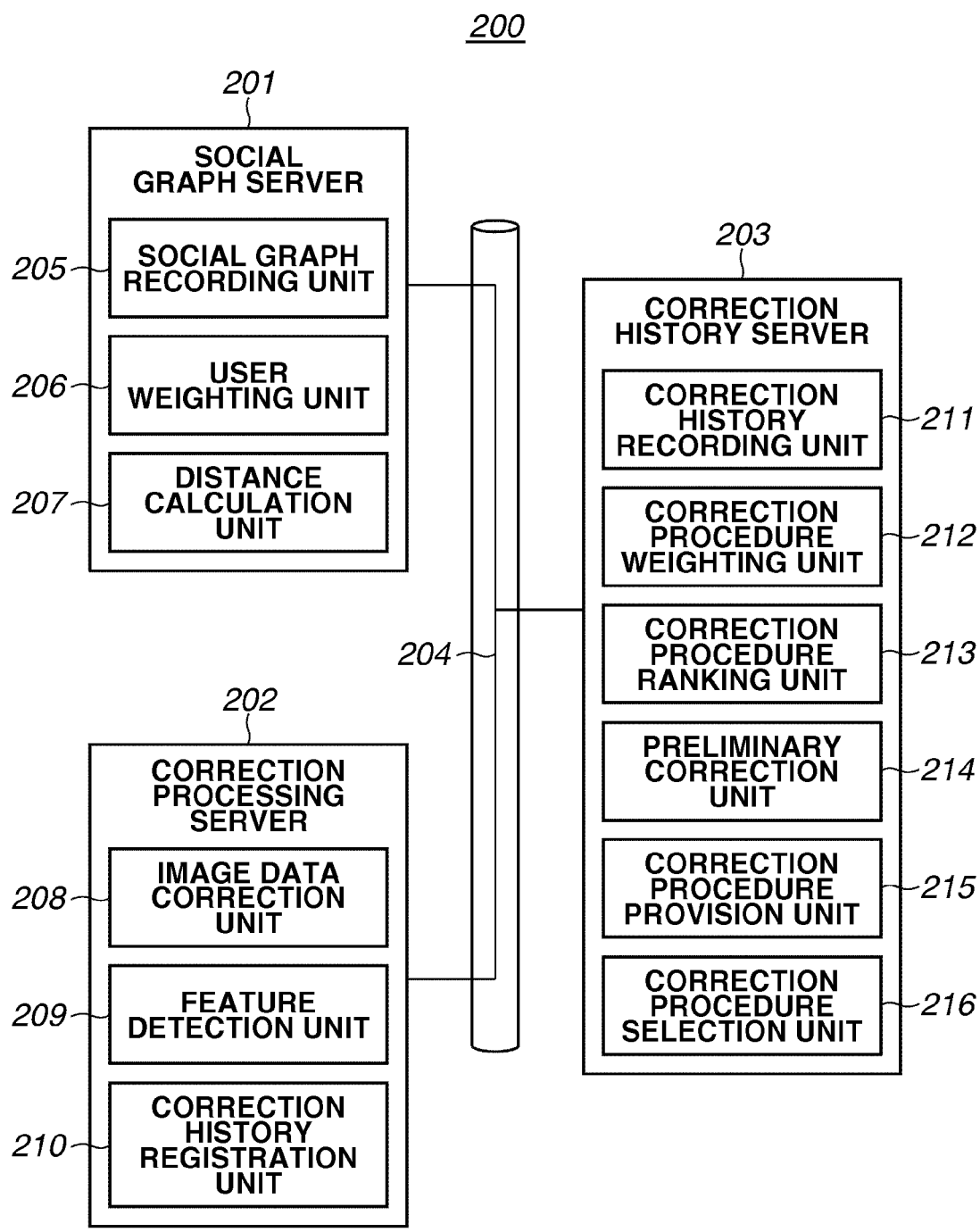
FIG. 2 is a block diagram illustrating a configuration of an image processing system according to an exemplary embodiment.

FIG. 2 is a block diagram illustrating a configuration of the image processing system according to the present exemplary embodiment. In FIG. 2, an image processing system 200 includes a social graph server 201, a correction processing server 202, and a correction history server 203.

Figure 3:
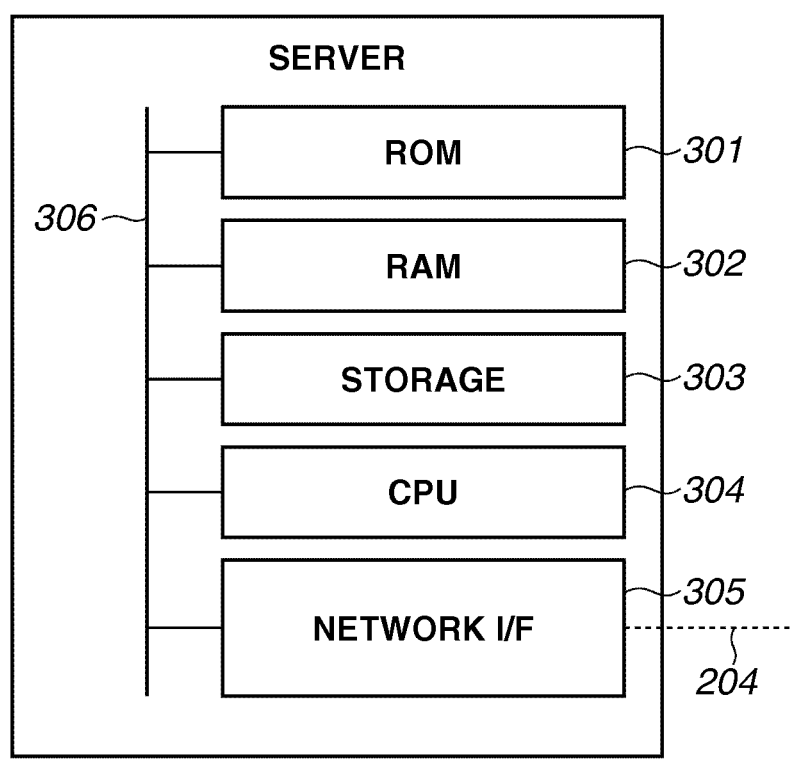
FIG. 3 is a block diagram illustrating a configuration of each server which constitutes an image processing system.

FIG. 3 is block diagram illustrating a configuration of each server which constitutes the image processing system 200. Each server includes a read only memory (ROM) 301 in which a program for realizing an operation of each server described below is stored, a random access memory (RAM) 302 as a work space or a temporary memory, and a storage 303 in which data to be permanently saved is stored. Each server further includes a central processing unit (CPU) 304 that controls an operation of each component by executing the program, and a network/interface 305 for communicating with other servers.

Further, in each server, respective components are communicably connected with one another via a bus 306. Further, in the image processing system 200, respective servers are communicably connected with each other via a network 204. Further, each server is a computer (information processing apparatus) that performs calculations or processing of information.

In FIG. 2, a social graph server 201 records a social graph formed based on activities of respective users in a social networking service (SNS) running on the network. In this case, the SNS according to the present exemplary embodiment allows each one of the users to upload images or blogs (diaries) on the SNS, and to perform evaluations or comments to the uploaded images or to other users.

Further, the SNS is a service for providing a venue for communication among users through activities on the above-described network (SNS). Further, each user is allowed to register one's profile such as a birthday, an occupation, a schedule, a diary, and disclose them to other users. Further, the user of the SNS is allowed to set other users as "friend" or "favorite", and exchange messages among users.

Further, users are allowed to post and disclose contents such as photographs. Further, comments or evaluations are given on the disclosed contents from other users. Further, in the SNS, the users are allowed to build a "group" which recruits other users having common hobbies, tastes, or attributes.

The SNS allows users to build a "group", to recruit other users having common hobbies, tastes, or attributes, or to participate in a "group" which other users have built. Further, the SNS enables number of transmission/reception times of messages between the users to be recorded.

Based on these activities of respective users in the SNS, relationships are built between respective users, and expression of the relationships as a graph are a social graph. In the present exemplary embodiment, the social graph is expressed as a graph formed by connecting nodes which represent users by edges.

The social graph server 201 includes the social graph recording unit 205 that records the social graph described above. Further, the social graph server 201 includes a user weighting unit 206 that assigns weights to respective users, based on the users' degrees-of-interest in each other, when the social graph is formed. The social graph server 201 further includes a distance calculation unit 207 that calculates a distance which is a measure of degree-of-relationship on the social graph of the users. Each function of the social graph server 201 functions as a first determination unit configured to determine the relationship between users configured by the usage of the predetermined service via the network.

In this case, the social graph which the social graph server 201 manages is a weighted directed graph which contains nodes representing users of the image processing system 200, and further representing unidirectional or bidirectional reference relationships among the users as edges. More specifically, reference relationships among the users represent that a certain user has interest in other users.

Further, the user weighting unit 206 assigns weights to the edges connecting the nodes which represent the users, based on one user's degree-of-interest in the other user. Furthermore, the user weighting unit 206 assign weights to the nodes which represent users, based on degree-of-interest received from other users.

As an example, one user A's interest in the other user B is represented by the fact that the user A has registered the user B as a friend. Further, one user A's interest in the other user B is represented by the fact that the user A performs evaluations of images which the user B uploaded on the SNS.

In addition, it is also represented by the fact that the user A and the user B have interest in the same hobby, and give evaluations to the same image or web page. Further, when they belong to the same "group" on the SNS, mutual interest is regarded as high, and the weights become high. Furthermore, if the "group" on the SNS is related to images, the weights become higher.

Further, the user A's degree-of-interest in the user B is determined based on rating information which the user A has assigned to the user B, or sending frequency of messages from the user A to the user B. Furthermore, the degree-of-interest is determined further based on a number of common hobbies of the user A and the user B, or a number of web pages to which both give evaluations.

Figure 4:
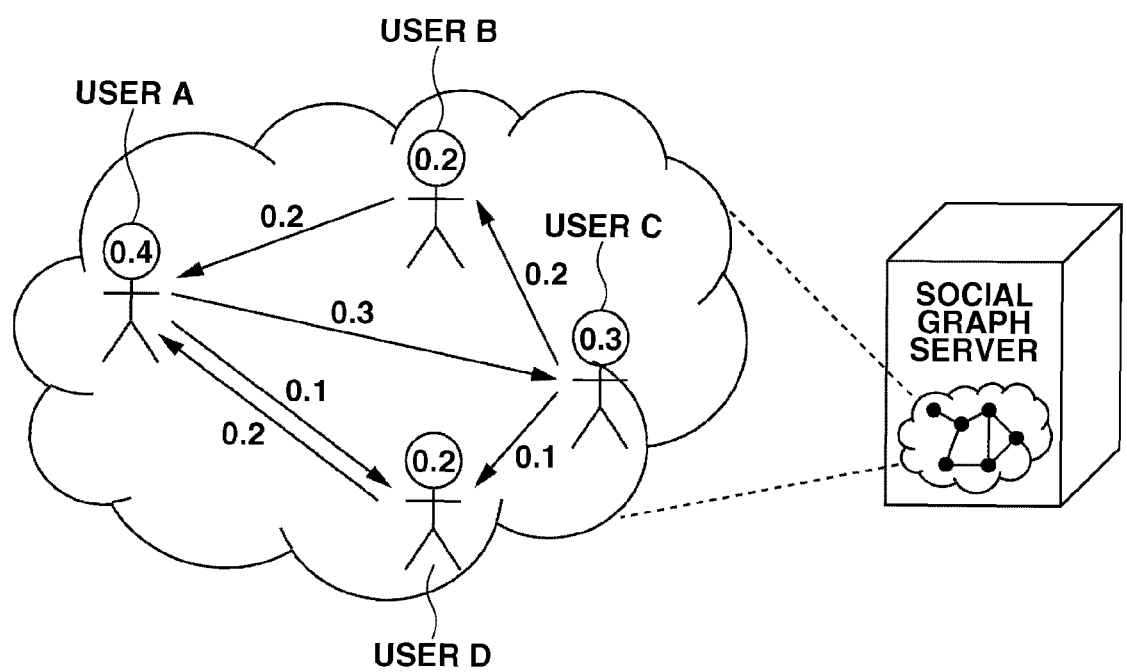
FIG. 4 is a graph illustrating an example of a social graph containing nodes which represent users.

FIG. 4 is a diagram illustrating an example of the social graph containing nodes which express users of the image processing system, to be recorded on the social graph server 201.

In FIG. 4, weights in the range between 0 and 1 are assigned to edges of the social graph based on a user's degree-of-interest in other user. Further, a node which represents a user is weighted by a value obtained by adding up the weights of the edges having the user as an endpoint.

The weight of edges indicates that as the number is greater, a user which represents a node at a starting point has the stronger interest in a user which represents a node at an endpoint. Score "1" represent the highest degree-of-interest, and score "0" represents the lowest degree-of-interest. Further, the weight of nodes indicates that as the number is greater, the user which represents the node in the entire social graph receives interest from other users.

For example, in FIG. 4, the user A registers the user C and the user D as friends, and ratings of 3-point (on a 10-point scale) to the user C and 1-point (on a 10-point scale) to the user D are given, based on the images which the user C and the user D have uploaded on the SNS, for example. Further, the user A is registered as a friend from the user B and the user D, and is given the rating of 2-point from each user.

The social graph server 201 builds the social graph illustrated in FIG. 4, based on information indicating the activities on the network of respective users. Further, in the social graph illustrated in FIG. 4, edges in a single direction are formed between the user A and the user B, and between the user A and the user C, and edges in both direction between the user A and the user D are formed, based on friend registration in the SNS.

Further, based on the ratings from other users of images which respective users have uploaded, edges are extended from the user A to the user C and the user D, and are weighted with 0.3 and 0.1, respectively.

Then, edges extended from the user B and the user D to the user A are weighted with 0.2, respectively. Furthermore, since 0.4 is obtained by adding up all the weights of the edges having terminations at the node which represents the user A, namely, the node which represents the user A is weighted with 0.4. FIG. 5 illustrates an example of a data structure which the social graph recording unit 205 holds.

In FIG. 5, information of the same attributes (for example, identifier) is arrayed in a column direction of the table and information corresponding to each attribute is arrayed in a row direction. More specifically, identifiers which represent nodes contained in the social graph are arranged in the columns of identifiers in the table a and the table b.

Further, a type of target which the nodes represent is arranged in the column of class in the table a, weights of the nodes are arranged in the column of weight. Furthermore, identifiers of other nodes connected by edges are arranged in the column of adjacent point in the table b, and weights of the edges are arranged in the column of weight.

In the tables in FIG. 5, various types of information arranged in the row direction are associated with one another. For example, in the table a, identifier "1", class "user", and weight "0.3" are associated with one another, and in the Table b, identifier "1", adjacent point "3", and weight "0.3" are associated with one another.

Returning to FIG. 2, descriptions of the configuration of the social graph server 201 will be continued. The distance calculation unit 207 of the social graph server 201 calculates a distance-between-users which is a distance on the social graph between the users arbitrarily selected, based on the social graph which the social graph recording unit 205 has recorded.

More specifically, the distance calculation unit 207 obtains a length based on the weight of an edge, for each edge present on a path connecting the nodes which represent two users on the social graph, and calculates a distance-between-users based on the calculated length of each edge. In other words, the distance calculation unit 207, based on information (the social graph) indicating a relatedness between a user and other person built by activities on the network, determines a relatedness between the user and the other person (first determination).

Subsequently, a configuration of the correction processing server 202 will be described. The correction processing server 202 includes an image data correction unit 208 that performs correction on images which the user has uploaded, based on the correction procedure already performed on other images. Further, the correction processing server 202 includes a feature detection unit 209 that detects image features which are features of the image data.

The correction processing server 202 further includes a correction history registration unit 210 that register correction procedures performed on image data, image features of the image data, and users who has configured the correction procedures in association with one another on the correction history server 203 described below.

The image data correction unit 208 performs correction on the image data, based on the correction procedures which are a series of processing procedures which the user instructed when the user performed correction on the image data. More specifically, the image data correction unit 208 performs image correction processing such as γ curve correction processing, space filter processing, skin-color highlight processing, red-eye processing, and hue conversion in order as instructed by the user, on the image data which the user performs correction.

The image processing on the image data is performed based on correction parameters such as γ curve, space filter radius, skin color highlight amount, red-eye processing range specified by the user. Further, the image data correction unit 208 performs the correction processing on the image data, in accordance with the correction procedure which the correction history server 203 holds.

The feature detection unit 209 detects image features which are features of the image data which has been subjected to correction in the correction processing server 202 or the input image data. More specifically, the feature detection unit 209 analyzes the image data which has been subjected to correction in the correction processing server 202.

Then, the feature detection unit 209 detects a histogram serving as an indicator which quantitatively expresses features of images, edge amount, image feature amount such as position or size of person's face, red-eye, and context information such as names of objects or persons captured in the image, a shooting location and a shooting date/time.

The correction history registration unit 210 notifies the correction procedure performed on the image data in the correction processing server 202, the users who have configured the correction procedures, and image features of the image data detected by the feature detection unit 209 to a correction history recording unit 211 described below through the network 204. The correction history registration unit 210 registers the registered correction procedure and the corrected images which are subjected to correction according to the correction procedure at the same time.

Subsequently, a configuration of the correction history server 203 will be described. The correction history server 203 includes the correction history recording unit 211 that records information of the correction procedures performed on the image data, the image features of the image data, the users who have configured the correction procedures in association with one another, in response to registration request from the correction processing server 202.

Further, the correction history server 203 further includes a correction procedure weighting unit 212 that adds weight information to the correction procedures recorded in the correction history recording unit 211, and a correction procedure ranking unit 213 that ranks a plurality of correction procedures recorded in the correction history recording unit 211.

The correction history server 203 further includes a preliminary correction unit 214 that performs correction on the image data in advance based on the correction procedures, and a correction procedure provision unit 215 that provides the correction procedures ranked by the correction procedure ranking unit 213 to an external apparatus. The correction history server 203 further includes a correction procedure selection unit 216 that selects any one from among the correction procedures provided by the correction procedure provision unit 215 based on the user operation.

The correction history recording unit 211 stores correction procedures, image features, and user information notified from the correction history registration unit 210 in association with one another, as a correction history. FIG. 7 illustrates an example of a data structure which the correction history recording unit 211 records and holds.

The correction history recording unit 211 records a plurality of tables, and archives which stores documents describing a nested structure in a storage 303 in the correction history server 203. In FIG. 7, the table 2a is used to manage identifiers which identify correction histories corresponding to each corrected image, identifiers which identify correction procedures, identifiers which identify image feature, and identifiers which identify users in association with one another.

An archive 2b is a set of text data indicating specific processing contents of correction procedures. In each text data, correction procedure identifier, whether γ curve correction processing, space filter processing, skin color highlight processing, and red-eye processing have been performed, and, if performed, the correction parameters and the like are described according to order of applying the correction processing.

The table 2c is table data indicating image features of corrected images. The table 2c is table data describing in detail image features corresponding to each image feature identifier written in the table 2a.

More specifically, information such as a histogram of an image, edge amount in an image, a number of detected face regions, a shooting location and shooting date/time is held in the table 2c as image features. Table 2d is table data indicating information about persons appearing on the corrected image. In the table 2d, image features identifiers, positions and sizes of faces of persons captured in the image corresponding to the image feature identifiers, presence/absence of the red-eye, and names of persons are arranged.

Further, in the tables in FIG. 7, various types of information arranged in a row direction are associated with one another. For example, in the table 2a, history number "1", correction procedure identifier "1", image feature identifier "1", and user identifier "1" are associated with one another.

Further, in the archive in FIG. 7, respective elements described in the document are associated with one another. For example, in the archive 2b, correction procedure elements such as, an identifier "1", and space filter elements arranged in order in a nested manner, a red-eye processing element, a γ curve element, and a skin color highlight element are associated with one another.

Returning to FIG. 2, the configuration of the correction history server 203 will be continued. The correction procedure weighting unit 212 inquires of the distance calculation unit 207 through the network 204, about user information associated with the correction procedures recorded by the correction history recording unit 211 and distances between users and other users.

The correction procedure weighting unit 212 assigns weights to the correction procedures based on the distances-between-users obtained as a result of the inquiry. The correction procedure ranking unit 213, with respect to a plurality of correction procedures weighted by the correction procedure weighting unit 212, performs ranking of the plurality of correction procedures based on the weights and similarities between the correction target image and the images corresponding to the correction procedures.

The preliminary correction unit 214 generates preliminary corrected images which were subjected to correction in advance, on the correction target image data notified from the correction procedure provision unit 215 described below before the user's instruction, according to the correction procedure similarly notified from the correction procedure provision unit 215.

The correction procedure provision unit 215, in response to an inquiry from a user, provides correction procedure to the user, according to ranking by the correction procedure ranking unit 213 out of the correction procedures recorded by the correction history recording unit 211.

Figure 6:
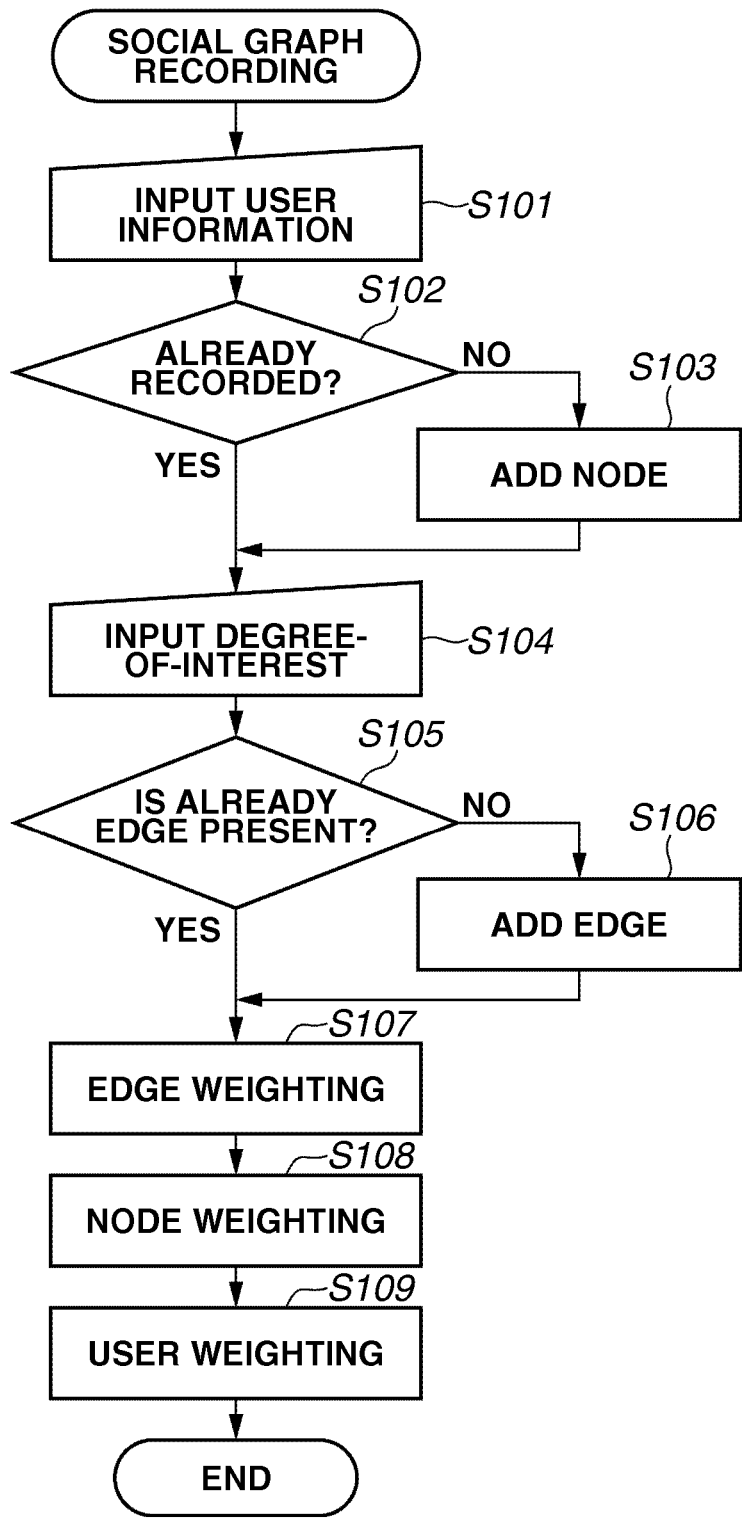
FIG. 6 is a flowchart illustrating social graph recording processing.

An operation of the image processing system having the above configurations will be described below in detail. FIG. 6 is a flowchart illustrating social graph recording processing executed by the social graph server 201.

In step S101 of FIG. 6, the social graph recording unit 205 inputs information indicating the activity in the network about new user. Then in step S102, the social graph recording unit 205 determines whether the user corresponding to the input information has been already recorded.

If the user has not been recorded (NO in step S102), then, in step S103, the social graph recording unit 205 analyzes the input information indicating the activity on the network, and adds the corresponding user to the social graph as a node.

Next, the social graph recording unit 205 analyzes information indicating the activity on the network, and determines a relationship with other user on the social graph. For example, it is determined whether the other user who is set as "friend" contained in the input information indicating the activity on the network is present as a node on the social graph.

Then, in step S104, the social graph recording unit 205 acquires degree-of-interest with the other user based on a common group, a message exchange frequency with other user, evaluations on images corresponding to the other user contained in the information indicating the activity on the network.

Then, in step S105, the social graph recording unit 205 determines whether an edge is present between the input user and the other user (between nodes) on the social graph held therein. If an edge is not present (NO in step S105), then, in step S106, the social graph recording unit 205 adds an edge based on the acquired degree-of-interest with the other user.

Next, in step S107, the social graph recording unit 205 sets weight on the edge based on the input degree-of-interest, and in step S108, updates the weight of the node on the social graph, based on the weight of the added edge.

In step S109, the user weighting unit 206 updates the weight of the corresponding user, based on the degree-of-interest of the updated node. As described above, the social graph server 201 creates and records the social graph.

Figure 8:
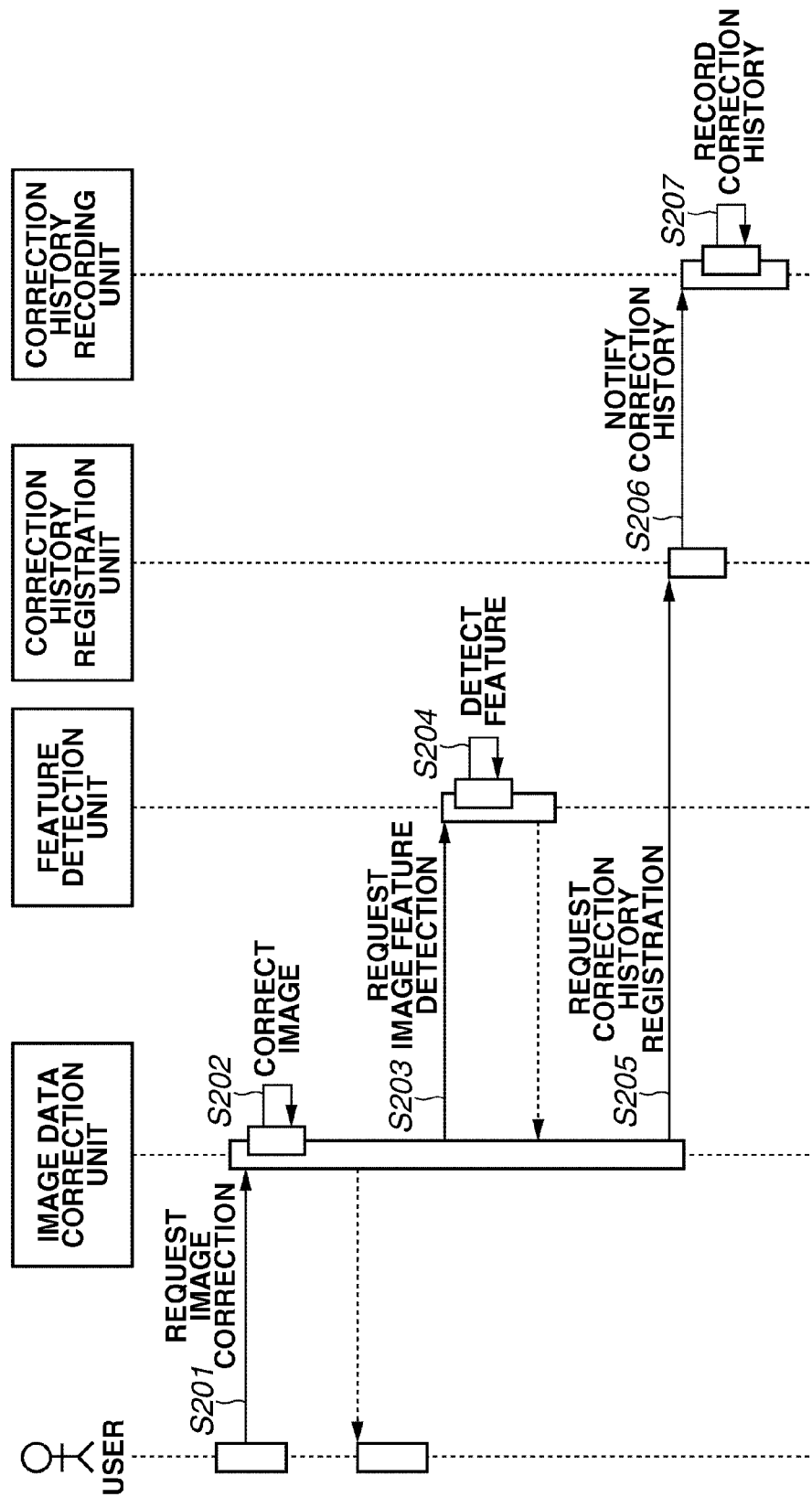
FIG. 8 is a sequence diagram illustrating correction procedure recording processing.

Subsequently, correction procedure recording processing performed by the correction history server 203 that records the image correction procedure executed in the correction processing server 202 will be described. FIG. 8 is a sequence diagram illustrating the correction procedure recording processing.

In FIG. 8, in step S201, a user inputs image data and correction procedures into the correction processing server 202 via the network. In step S202, the image data correction unit 208 in the correction processing server 202 to which the image data has been input, performs correction on the image data, based on the correction procedures input together with the image data.

Next, in step S203, the image data correction unit 208 inputs the image data into the feature detection unit 209, then, in step S204, the feature detection unit 209 detects image features from the image data. In step S205, the image data correction unit 208 inputs the correction procedures performed on the image data, information of users who have configured the correction procedures, and image features of the image data detected by the feature detection unit 209, to the correction history registration unit 210.

In step S206, the correction history registration unit 210 sends the input correction procedures, the image features, and the user information in association with one another to the correction history recording unit 211 in the correction history server 203 via the network. In step S207, the correction history recording unit 211 in the correction history server 203 stores the correction procedures, the image features, and the user information notified from the correction processing server 202 in association with one another.

Figure 9:
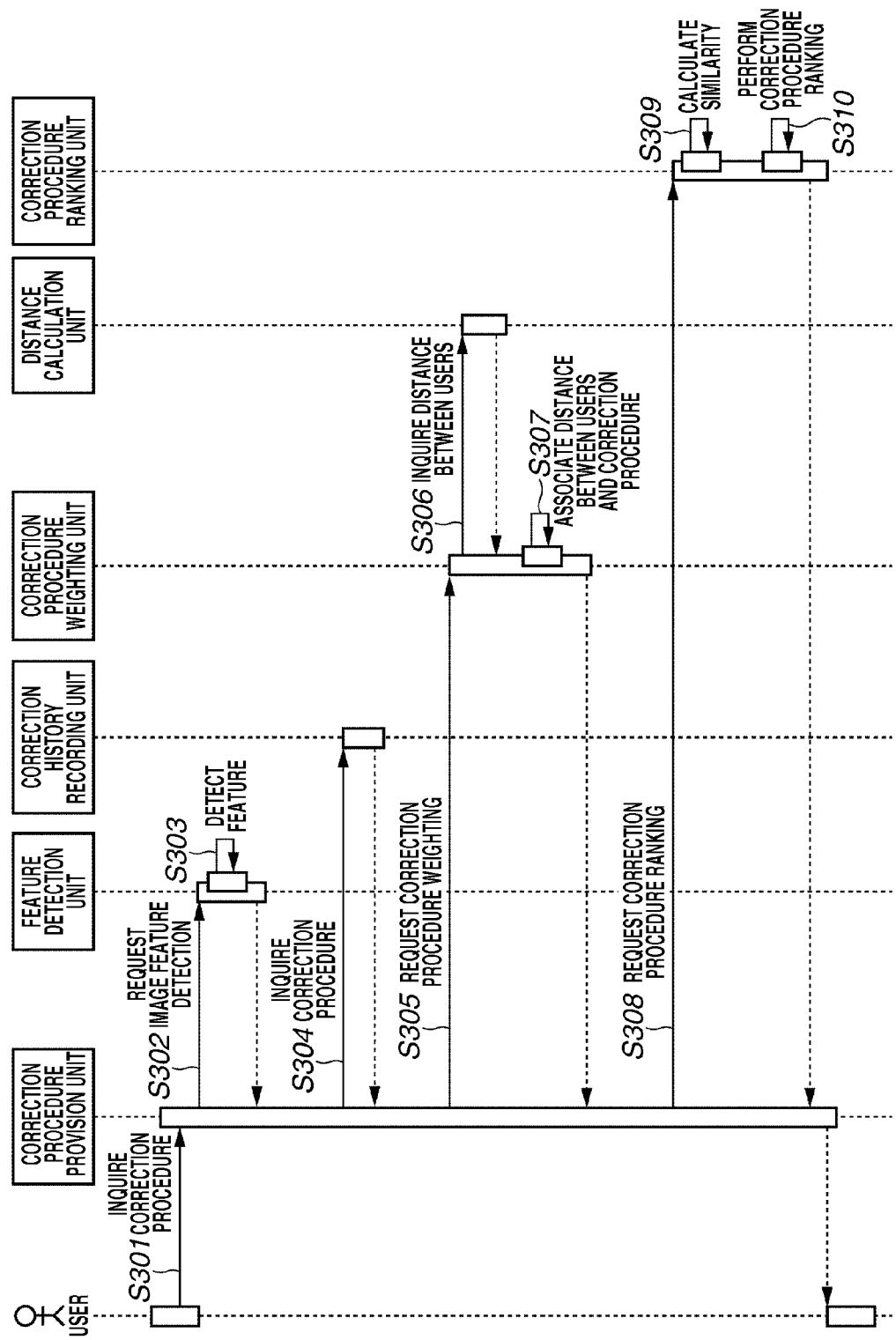
FIG. 9 is a sequence diagram illustrating correction procedure provision processing.

Subsequently, correction procedure provision processing for providing the correction procedures recorded by the correction procedure recording processing which has been described with reference to the above-described FIG. 8 to the other user will be described. FIG. 9 is a sequence diagram illustrating the correction procedure provision processing.

In FIG. 9, in step S301, a user who requests for a correction procedure makes an inquiry of the correction history server 203 about requesting the correction procedures for the image data as well as the correction target image data and information about the user. In this case, information about the user is supposed to be information which enables unique identification of the user, such as identification (ID) in the SNS.

In step S302, the correction procedure provision unit 215 in the correction history server 203, upon receiving the inquiry, inputs the received image data to the feature detection unit 209 in the correction processing server 202 through the network 204. In step S303, the feature detection unit 209 in the correction processing server 202 detects image features from the input correction target image data, and sends back the detected image features to the correction history server 203.

Furthermore, the correction procedure provision unit 215 acquires the correction procedures performed on other images having image features similar to image features of the correction target image data from the correction history recording unit 211. Further, in step S304, the correction procedure provision unit 215 acquires, in addition to the correction procedures, user information and image features associated with the correction procedures at the same time from the correction history recording unit 211.

In order to determine the other image having image features corresponding to the image features of the correction target image data, a difference between the values of the image features is calculated. Then, the correction history server 203 selects and acquires only the correction procedure of image which allows a difference between the values of the image features to be a value smaller than a certain value, from the correction history recording unit 211.

Next, in step S305, the correction procedure provision unit 215 inputs user information of the user who has made an inquiry requesting for a correction procedure and user information associated with the correction procedures acquired in step S304 to the correction procedure weighting unit 212.

The correction procedure weighting unit 212 inputs the user information requesting for the correction procedures and the user information associated with the correction procedures to the distance calculation unit 207 in the social graph server 201 through the network 204. Then, in step S306, the correction procedure weighting unit 212 acquires a distance-between-users between the users. A distance-between-users calculated by the distance calculation unit 207 is obtained from the following equation (1).

$$d = \sum_{i=1}^{n} \frac{1}{w_i} \qquad \text{Equation (1)}$$

In the equation (1), $W_i$ represents a weight of each edge present on a path connecting the nodes corresponding to users who are a target for obtaining a distance on the social graph. At this time, the reciprocal of the weight of each edge is defined as a length of the edge, and the sum of lengths of the edges present on a path connecting the nodes is defined as a distance (d) of the path, and this is defined as a distance-between-users.

A path connecting the nodes on the social graph is assumed to trace a path with the shortest distance and the heaviest weight of edge. The as the weight of each edge present on the shortest path connecting the nodes which represent two users is greater, the value of a distance-between-users becomes smaller.

In other words, it can be determined that as the distance-between-users is smaller, the hobbies or tastes of the users are more similar to each other, and the mutual interests are higher. Further, the distance calculation unit 207 acquires at the same time weight of a node corresponding to the user associated with the correction procedure on the social graph.

Next, in step S307, the correction procedure weighting unit 212 associates the acquired distance-between-users d, and the correction procedure corresponding to the distance-between-users. In step S308, the correction procedure provision unit 215 inputs image features of the correction target image data, correction procedure associated with the distance-between-users, image features corresponding to respective correction procedures, and weight of nodes corresponding to each user associated with each of the correction procedures, to the correction procedure ranking unit 213.

In step S309, the correction procedure ranking unit 213 calculates similarity between images, by using image features of the correction target image data and image features associated with the correction procedures. In other words, the correction procedure ranking unit 213 determines the relationship between the images, by obtaining similarity between images (second determination). In other words, the correction procedure ranking unit 213 functions as a second determination unit configured to determine the relationship between the first image and the second image.

Next, in step S310, the correction procedure ranking unit 213 performs ranking of the correction procedure, based on the weight on the social graph of the user associated with the correction procedure, the calculated similarity, and the distance-between-users associated with the correction procedure. Rank of the correction procedure is determined based on the following equation (2).

$$s = ar + \frac{b}{f} + \frac{c}{d} \quad \text{Equation (2)}$$

In equation 2, "r" is weight of a user on a social graph associated with correction procedure, "f" represents a value obtained by calculating a difference between image feature of image data which the user inputs and image feature associated with the correction procedure. Further, "d" represents a distance-between-users between a user which requests for the correction procedure and a user associated with the correction procedure. Herein, "a", "b", and "c" are arbitrary constants.

At this time, the rank of the correction procedures is such that the greater the weight of the user on the social graph associated with the correction procedure (the more frequently referred from other user on the social graph (the user receives the more interest from other user)), the more highly the user is ranked.

In other words, the correction procedure performed by the user who receives the more interest from other user will be evaluated more highly. That is, the correction procedure of the user who has uploaded on the SNS an image which has been subjected to such image correction that receives interest from other user can be positively recommended.

Further, the smaller the difference between an image feature of the image data which the user inputs and an image feature associated with the correction procedure, the more highly the correction procedure is ranked. In other words, the correction procedure performed on an image having composition, color, saturation, object similar to those of the correction target image can be positively recommended.

Furthermore, the smaller the distance-between-users between the user who has made an inquiry (the user who has requested for correction procedure) and the user associated with the correction procedure, the more highly the correction procedure is ranked. In other words, the correction procedure performed by a person with a close distance-between-users, such as a person considered to have hobbies and tastes similar to those of the user who has requested for the correction procedure, can be positively recommended.

Next, the correction procedure provision unit 215 provides the ranked correction procedure to the user. At this time, the correction procedure provision unit 215, for all or a part of the ranked correction procedures, may generate a preliminary corrected image obtained by performing correction in advance on the image data notified from the user based on the correction procedure using the preliminary correction unit 214. The correction procedure provision unit 215 may provide the preliminary corrected image after associating with the correction procedure to the user. In other words, the correction procedure provision unit 215 functions a recommendation unit configured to recommend the correction procedure performed on the second image according to the determination results of the first determination unit and the second determination unit.

Furthermore, the correction procedure selection unit 216 provides means for presenting the correction procedures provided after having been ranked to the user, and for allowing the user to select arbitrary correction procedure by using an operation screen or the like. At this time, the correction procedure selection unit 216 may present the preliminary corrected image associated with the correction procedure provided after having been ranked to the user (second presentation).

The correction procedure selection unit 216 may provide means that allows the user to select an arbitrary preliminary corrected image using the operation screen or the like, and allows the user to select a correction procedure associated with the selected preliminary corrected image (first presentation). In other words, the means allowing the user to select arbitrary correction procedure may employ a configuration for allowing the user to select an image corresponding to each correction procedure, or a configuration for allowing the user to select a preliminary corrected image obtained by correcting the correction target image based on each correction procedure.

The image data correction unit 208 detects the selected correction procedure, performs correction of the correction target image data, based on the correction procedure, and provides the correction target image which has been corrected according to the correction procedure to the user.

As described above, the user can receive recommendation of the ranked correction procedure, by inputting information of the user herself/himself and the image data to the correction history server 203 to inquire for the correction procedure. At this time, the correction procedure to be provided is ranked so that the greater the weight on the social graph of the user associated with the correction procedure, the more highly the correction procedure is ranked.

Further, the smaller the difference between image feature of the image data input by the user and image feature associated with the correction procedure, the more highly the correction procedure is ranked. Further, the smaller the distance-between-users between a user which has made inquiry and the user associated with the correction procedure, the more highly the correction procedure is ranked. Consequently, the user can select a correction procedure suitable for the correction target image data, and configured by other user having similar preference to that of the user.

Therefore, the user can readily select a correction procedure which enables converting the target image data into an image which is consistent with its own preference. Further, since the correction procedure configured by the user which attracts interests from many users is ranked more highly, the user is allowed to convert into an image which is consistent with its own preference, according to the correction procedure configured by a user believed to be familiar with image correction technique.

Furthermore, in a case where the ranked correction procedure is associated with the preliminary corrected image using the preliminary correction unit 214, the user can confirm visually in advance a finish when an image is subjected to the correction procedure. As a result, the user can more readily select a correction procedure which enables converting into an image which is consistent with the user's own preference.

According to the present exemplary embodiment, a first determination for determining a relationship between users and a second determination for determining a relationship between images are performed, and according to these determination results, the image correction processing which has been performed on the corrected image, can be performed on the correction target image.

In the first exemplary embodiment, in the correction procedure recording processing illustrated in FIG. 8, a configuration for detecting image features of the corrected image data, and recording the image features in association with the correction procedures is supported, but a configuration for recording image data itself or reference information such as a uniform resource locator (URL) of the image data may be used. In this case, in step S304 of the correction procedure provision processing, the correction procedure provision unit 215 is configured to detect image features of the image data acquired based on the image data associated with the correction procedures or image reference information.

A configuration for acquiring a correction procedure for actual use in correction of the correction target, based on the user's specification from a plurality of correction procedures has been described. However, a configuration for providing, for example, an image automatically corrected by the correction procedure ranked at the highest rank to the user may be used.

According to the present exemplary embodiment described above, by recording the image data itself in place of image features or reference information to the image data as correction history, the necessity for detecting image features before recording the correction history is eliminated. Further, detection processing of image features from the image data identified by the image reference information may be configured to perform at an arbitrary timing before step S308. For this reason, a load of the detection processing of the image features can be temporarily distributed.

In a second exemplary embodiment, further based on images which the users of the image processing system 200 possesses or has interest therein, an example of calculating a distance-between-users will be described. The configuration of the present exemplary embodiment is substantially the same as the configuration of the above-described first exemplary embodiment, the same reference numerals are assigned to the same parts to those in the first exemplary embodiment, and therefore detailed descriptions will not be repeated. Differences from the first exemplary embodiment will be described in detail.

Figure 10:
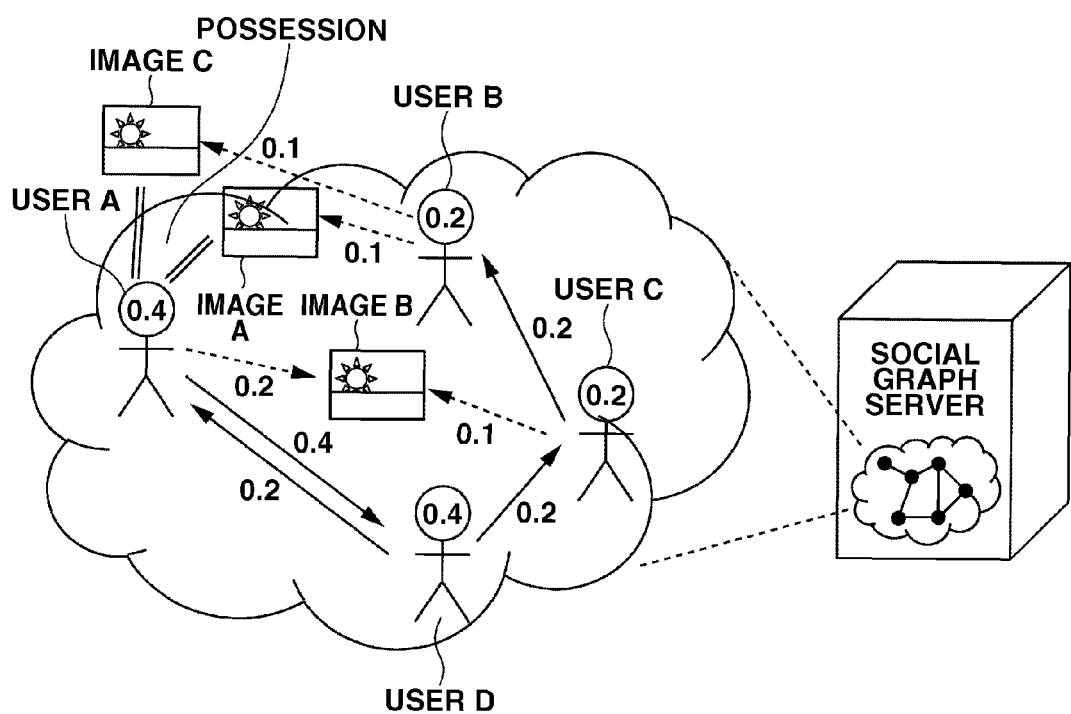
FIG. 10 is a diagram illustrating an example of a social graph further containing image data as nodes.

FIG. 10 illustrates an example of a social graph further containing image data as nodes.

In the present exemplary embodiment, when the information of the image data which the users of the image processing system 200 possesses is input into the social graph recording unit 205, the social graph server 201 adds the information of the image data as nodes. Further, the social graph server 201 builds a new graph added with an edge between the user which possess the image data and the node which represents the possessed image data.

Further, when the information of the image data in which the users have interest is input into the social graph recording unit 205, a new graph is built to which the information of the image data is added as the nodes, and the edges weighted based on the degrees-of-interest is added between the users and the image data. The users' interests in the images are represented by the fact that the users give evaluations on the images.

Further, the user A's degree-of-interest in the user B is determined based on rating information which the users have assigned to the images. In the example of the social graph illustrated in FIG. 10, edges connecting the users and the image data are weighted in a range between 0 and 1, based on the users' degrees-of-interest in the image data.

Further, weight of a node which represents a user is represented by a value obtained by adding up the weight of edges connecting other users and the user, terminated at the user and the image data which the user possesses. For example, the image A which the user A possesses is assigned a rating of 0.1 point from the user B.

Further, the image C which the user A possesses is assigned a rating of 0.1 point from the user B. At that time, the sum of all the weights of the edges connecting to the other users, terminated at the nodes which represent the user A and the images which the user A possesses, is 0.4, namely, the node which represents the user A is weighted with 0.4.

In a case where a distance-between-users is calculated using the social graph illustrated in FIG. 10, by way of an example, the distance-between-users can be calculated, regarding an edge extended from one user toward an image which the other user possesses, as an edge imaginarily connected between the users.

Further, in a case where a plurality of edges are extended from the other user, to a plurality of images which one user possesses, the distance-between-users can be calculated, regarding that one user and the other user are connected by bidirectional imaginary edges having a value obtained by inversely varying the total of the weights of respective edges as its length.

Further, in a case where edges are extended from two users toward an image, the distance-between-users can be calculated, regarding that the users are connected by bidirectional imaginary edges having a value obtained by inversely varying the total of the weights of respective edges as its length.

Further, if there is an image of which correction procedure is recorded on the social graph, and the user which has requested for correction procedure performs evaluations on the image, a configuration for highly ranking the correction procedure of the image can be used.

In this manner, when a distance-between-users is calculated, by creating the social graph containing the image data as the nodes, and added with edges between the users which possesses the image data or have interest therein, the user's interest in the image can be reflected. Further, other users having a preference coincident with that of the user can be more accurately identified.

In a third exemplary embodiment, an example of adding a correction procedure applied when the user of the image processing system 200 performed correction on the image data, to the nodes on the social graph, and calculating a distance-between-users will be described. The configuration of the present exemplary embodiment is substantially to the same as the configuration of the above-described first exemplary embodiment, and the same reference numerals are assigned to the same parts as those in the first exemplary embodiment, and therefore detailed descriptions thereof will not be repeated. Differences from the first exemplary embodiment will be described in detail.

Figure 11:
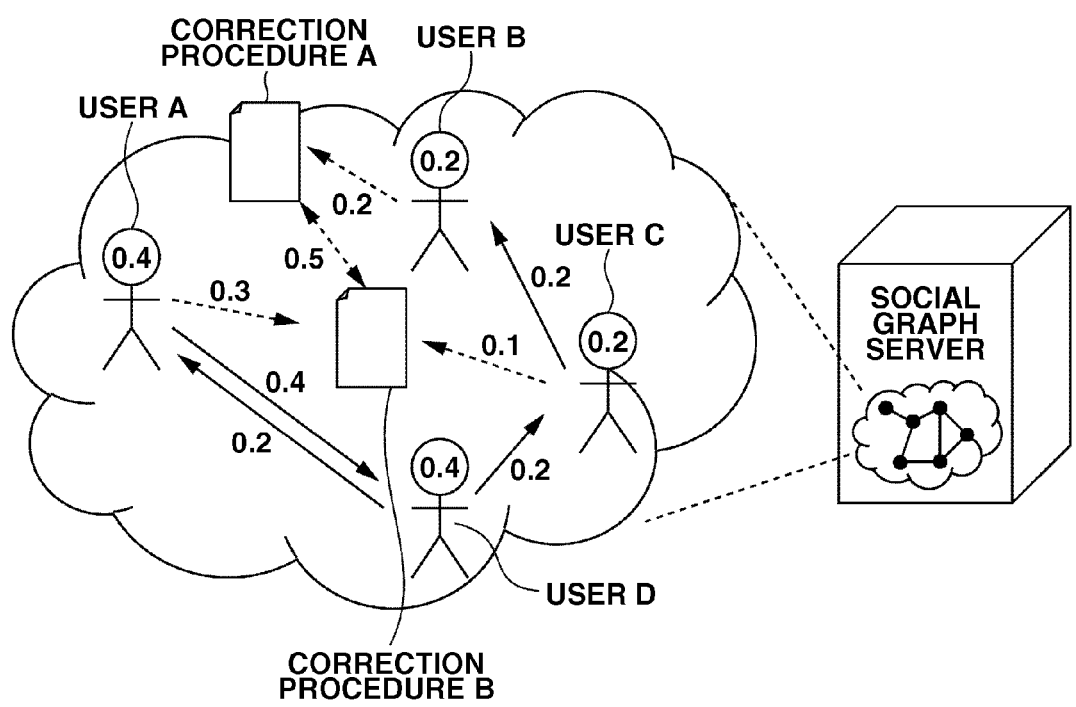
FIG. 11 is a diagram illustrating an example of a social graph further containing correction procedures as nodes.

FIG. 11 illustrates an example of the social graph further containing correction procedures as nodes. In the present exemplary embodiment, the social graph recording unit 205 in the social graph server 201, when information of the correction procedures which have been provided to the users is input to the image processing system 200, adds the information of the correction procedures as nodes.

Further, the social graph server 201 builds a new graph added with edges which is weighted based on a number of times the user applied the correction procedure, between the correction procedures added as the nodes and the users thereof. Further, the social graph recording unit 205 builds a new graph added with edges weighted based on the correction procedures added as the nodes and similarities between the correction procedures.

In the example of the social graph illustrated in FIG. 11, an edge connecting a user and a correction procedure is weighted in a range between 0 and 1 based on a number of times the user applied the correction procedure. Similarly, an edge connecting the correction procedures is weighted in a range between 0 and 1 based on similarity between the correction procedures.

For example, the correction procedure A has been applied two times by the user B in FIG. 11, and an edge weighted with 0.2 from the user B to the correction procedure A is created. Further, the correction procedure B was applied by the user A and the user C three times and one time respectively, and the correction procedure B allows edges to be created, the edges being weighted with 0.3 and 0.1 respectively, from the user A and the user C to the correction procedure B.

Further, similarity between the correction procedure A and the correction procedure B is 50%, and the correction procedure A and the correction procedure B are connected by bidirectional edge weighted with 0.5.

When a distance-between-users is calculated using the social graph illustrated in FIG. 11, a method for calculation of the distance-between-users in a case where edges are connected from two users toward the correction procedure is problematic.

In this case, it is regarded that the users are connected by bidirectional imaginary edge having a value obtained by inversely varying the total of the weights of respective edges as its length. By regarding that in this way, the distance-between-users can be calculated.

Further, in a case where the correction procedures are connected by edge, it can be regarded that the edge is a portion of a path connecting the nodes which represent two users. The method for calculating the length of the imaginary edge connecting the users is not limited to the method as described above.

In this manner, in the present exemplary embodiment, the correction procedures are contained as the nodes, and an edge is added between the correction procedure and the user who has applied the correction procedure and performed correction on the image data. Therefore, when the distance-between-users is calculated, the user's preference to the correction procedure can be reflected, and other user having coincident preference with that of the user can be more accurately identified.

In a fourth exemplary embodiment, descriptions will be made of the example of performing ranking of the correction procedures, based on history in which the correction procedures which the user of the image processing system 200 configured when subjecting the image data to correction were again applied, or further based on history in which the correction procedures generated based on existing correction procedures (hereinafter, referred to as "derived correction procedure") were configured.

The configuration of the present exemplary embodiment is substantially to the same as the configuration of the above-described first exemplary embodiment, and the same reference numerals are assigned to the same portions as those in the first exemplary embodiment, and therefore detailed descriptions thereof will not be repeated. Differences from the first exemplary embodiment will be described in detail.

In the present exemplary embodiment, when the image data is subjected to correction, based on the correction procedure recorded by the correction history recording unit 211, the history thereof is recorded.

FIG. 1 illustrates an example of a case in which a correction procedure configured when subjecting certain image data to the correction procedure is also applied again to other images, or a derived correction procedure is newly configured based on the correction procedure.

In this case, the correction procedure A is applied to the image A, the image B, and the image C. At that time, the correction history server 203 records the fact that the correction procedure A was applied to the image A, the image B, and the image C. Further, the correction procedure B configured by giving a change to the correction procedure A when performing correction is applied to the image D, and similarly the correction procedure C configured by giving a change to the correction procedure A when performing correction is applied to the image E.

At that time, the correction history server 203 records the fact that the correction procedure B and the correction procedure C were configured, based on the correction procedure A. Based on application examples of the correction procedures illustrated in FIG. 1, the correction procedure weighting unit 212 is capable of ranking the correction procedure based on a number of times the recorded correction procedure has been reapplied.

Further, when a derived correction procedure is newly configured from a correction procedure, the correction procedure weighting unit 212 is capable of ranking the correction procedure, based on a number of the derived correction procedures configured from the recorded correction procedure. In other words, based on a number of utilizations of the correction procedure, more frequently utilized correction procedure can be ranked higher than less utilized correction procedures.

In this manner, further based on the history which was used when the image data was subjected to correction, or the history in which derived correction procedures based on the existing correction procedure were configured, the correction procedure can be ranked. Therefore, the correction procedure which was applied several times or regarded as a derivation source when the image data was corrected can be evaluated as more important. For this reason, the user can readily select a correction procedure which receives supports from many other users.

Hereinabove, the exemplary embodiments have been described in detail, but the configurations of the image processing system 200 are only examples, and it is not limited to the above-described configurations. Any component may be deleted where necessary, and other component (s) may be added. Further, a configuration in which a single apparatus is provided with all or a part of functions and configurations which each server has, may be used.

According to the exemplary embodiments described above, a plurality of correction procedures can be ranked, based on similarities between features of the correction target image data, and features of the image data associated with the stored correction procedures. Further, the user can select a correction procedure suitable for the correction target image data, and therefore the user can readily configure a correction procedure suitable for the target image data.

Further, the correction procedures performed on the image data are recorded in association with the features of the image data, and the users who have configured the correction procedures. Further, a social graph, which contains nodes which represent users based on activities on the network, and contains reference relationships between the users as edges, is recorded.

As an example, edges on the social graph are weighted based on the degrees-of-interest between the users, and a distance between the nodes which represent the users on the social graph based on the weight can be calculated.

Further, the correction procedure is weighted based on a distance-between-users between the user which has configured the correction procedure and arbitrarily selected user.

Therefore, a plurality of correction procedures can be ranked based on similarities between features of the image data which becomes a correction target, and features of the image data associated with the correction procedures and the weight of the correction procedures.

A user can select a correction procedure suitable for the correction target image data and configured by other user having coincident preference with the user. Therefore, the user can readily configure a correction procedure which enables converting the target image data into an image which is consistent with the preference of the user.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-225103 filed Oct. 12, 2011, which is hereby incorporated by reference herein in its entirety.

What is claimed is:

1. An image processing system comprising:
a first determination unit configured to determine a relationship between a user and another person established through utilization of a predetermined service;
a second determination unit configured to determine a relationship between a first image uploaded on the predetermined service by the user, and a second image uploaded on the predetermined service by the another person, which is of the another person and has been subjected to image correction processing, wherein the image correction processing is processing to change brightness or a color of an image; and
a recommendation unit configured to, based on a determination result of the first determination unit and a determination result of the second determination unit, recommend the image correction processing performed on the second image to the user, as the image correction processing to be performed on the first image.

2. The image processing system according to claim 1, further comprising an evaluation unit configured to evaluate image correction processing performed on each of a plurality of images having been subjected to image correction processing according to a determination result by the first determination unit and a determination result by the second determination unit,
wherein the second determination unit determines a relationship between the first image and each of the plurality of images,
wherein the first determination unit determines a relationship between the user and a person corresponding to each of the plurality of images, and
wherein the recommendation unit recommends to the user, based on an evaluation by the evaluation unit, at least a part of image correction processing that has been performed on the plurality of images.

3. The image processing system according to claim 1, wherein the recommendation unit provides to the user a result of having corrected the first image through each image correction processing performed on the plurality of images.

4. The image processing system according to claim 2, further comprising:
a recording unit configured to record a history of adopted image correction processing out of image correction processing which the recommendation unit has recommended,
wherein the evaluation unit evaluates the plurality of images based on the history which the recording unit has recorded.

5. The image processing system according to claim 2, wherein the evaluation unit evaluates the image corresponding to the other person based on a relationship between the user and the other person and a relationship between the first image and the second image.

6. The image processing system according to claim 1, wherein the first determination unit determines a relationship between the user and the other person, based on at least any one of evaluations of images in the predetermined service, transmission/reception of messages in the predetermined service, a group to which the user belongs, and setting of the user as a friend of other users in the predetermined service.

7. The image processing system according to claim 1, wherein the second determination unit determines a relationship between the first image and the second image, based on similarity between the first image and the second image.

8. The image processing system according to claim 1, wherein the first determination unit determines a relationship between the user and the other person by using a social graph established by the predetermined service.

9. The image processing system according to claim 1, wherein the first determination unit is configured to determine the relationship based on a social graph, which is information representing a relationship between a plurality of users of the predetermined service as a graph structure.

10. The image processing system according to claim 1, wherein the predetermined service is Social Networking Service.

11. An image processing system comprising:
a first determination unit configured to determine a relationship between a user and another person established through utilization of a predetermined service;
a second determination unit configured to determine a relationship between a first image, which is of the user, and a second image, which is of the another person and has been subjected to image correction processing;
a recommendation unit configured to, based on a determination result of the first determination unit and a determination result of the second determination unit, recommend image correction processing performed on the second image to the user; and
a discrimination unit configured to determine image correction processing selected based on a user operation as image correction processing to be performed on the first image, out of a plurality of image correction processing recommended by the recommendation unit.

12. An image processing system comprising:
a first determination unit configured to determine a relationship between a user and another person established through utilization of a predetermined service;
a second determination unit configured to determine a relationship between a first image, which is of the user, and a second image, which is of the another person and has been subjected to image correction processing; and
a recommendation unit configured to, based on a determination result of the first determination unit and a determination result of the second determination unit, recommend image correction processing performed on the second image to the user, wherein the first determination unit determines a relationship between the user and the other person based on image correction processing which the user has used and image correction processing which the other person has used.

13. An image processing system comprising:
a first determination unit configured to determine a relationship between a user and another person established through utilization of a predetermined service;
a second determination unit configured to determine a relationship between a first image, which is of the user, and a second image, which is of the another person and has been subjected to image correction processing;
a recommendation unit configured to, based on a determination result of the first determination unit and a determination result of the second determination unit, recommend image correction processing performed on the second image to the user; and
an evaluation unit configured to evaluate each of a plurality of images according to a determination result by the first determination unit and a determination result by the second determination unit,
wherein the image processing system corrects the first image by image correction processing that has been performed on an image having the highest evaluation by the evaluation unit.

14. An image recommendation method, the method comprising:
determining a relationship between a user and another person established by utilization of a predetermined service;
determining a relationship between a first image uploaded on the predetermined service by the user, and a second image uploaded on the predetermined service by the another person, which is of the another person and has been subjected to image correction processing, wherein the image correction processing is processing to change brightness or a color of an image; and
recommending, based on a result of determining the relationship between the user and the another person and on a result of determining the relationship between the first image and the second, the image correction processing performed on the second image to the user, as the image correction processing to be performed on the first image.

15. A non-transitory computer-readable medium storing a program for causing a computer to execute an image recommendation method, the method comprising:
determining a relationship between a user and another person established by utilization of a predetermined service;
determining a relationship between a first image uploaded on the predetermined service by the user, and a second image uploaded on the predetermined service by the another person, which is of the another person and has been subjected to image correction processing, wherein the image correction processing is processing to change brightness or a color of an image; and
recommending, based on a result of determining the relationship between the user and the another person and on a result of determining the relationship between the first image and the second, the image correction processing performed on the second image to the user, as the image correction processing to be performed on the first image.

* * * * *